United States Patent

[11] 3,557,755

| [72] | Inventor | Donald S. Close<br>Stow, Ohio |
|---|---|---|
| [21] | Appl. No. | 807,212 |
| [22] | Filed | Mar. 14, 1969 |
| [45] | Patented | Jan. 26, 1971 |
| [73] | Assignee | Norton Company<br>Worcester, Mass.<br>a corporation of Massachusetts |

[54] MILKING INFLATION SHELL
12 Claims, 3 Drawing Figs.

[52] U.S. Cl. .................................................. 119/14.49,
119/14.47
[51] Int. Cl. ..................................................... A01j 05/04
[50] Field of Search ........................................... 119/14.47,
14.53, 14.31, 14.4, 14.49

[56] References Cited
UNITED STATES PATENTS

| 1,822,680 | 9/1931 | Taylor | 119/14.53 |
| 1,955,810 | 4/1934 | Hodsdon | 119/14.49 |
| 2,687,112 | 8/1954 | Shurts | 119/14.49 |
| 3,158,136 | 11/1964 | George | 119/14.52 |
| 3,474,760 | 10/1969 | Siddall et al. | 119/14.49 |

Primary Examiner—Hugh R. Chamblee
Attorney—Meyer, Tilberry & Body

ABSTRACT: A milking inflation shell for use with an automatic milking machine including an elongated, rigid cylindrical shell, port means in the shell adapted to be connected to a source of pulsating vacuum, and at least one aperture means in the shell defining a passageway between the interior and exterior of the shell.

PATENTED JAN 26 1971
3,557,755
FIG.1
FIG.2
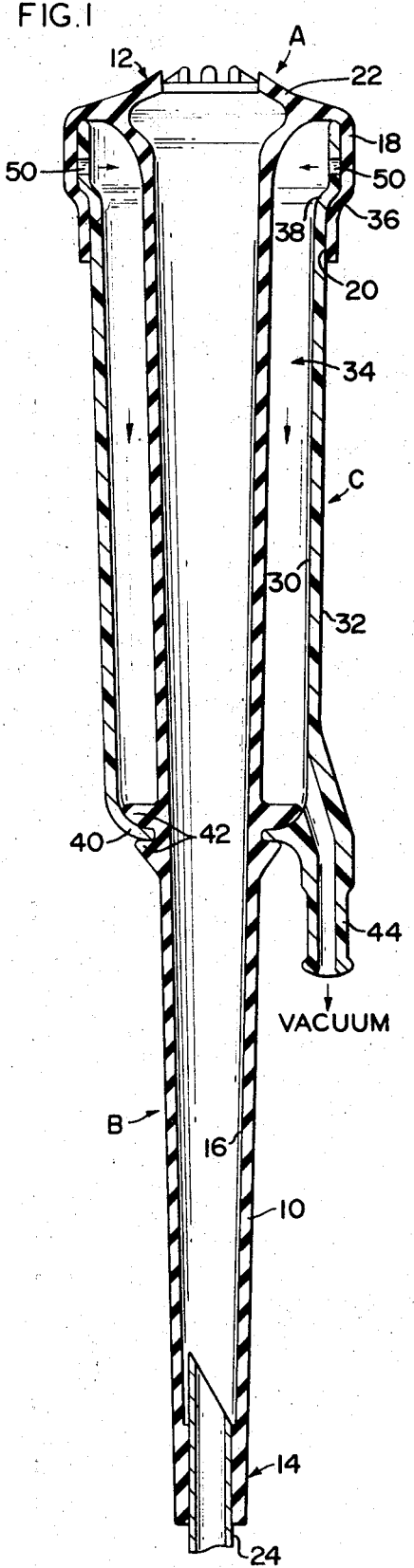
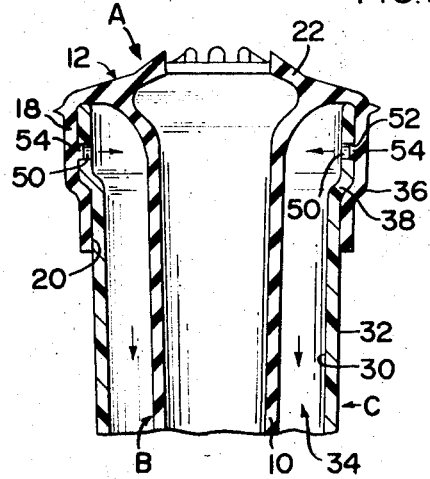
FIG.3
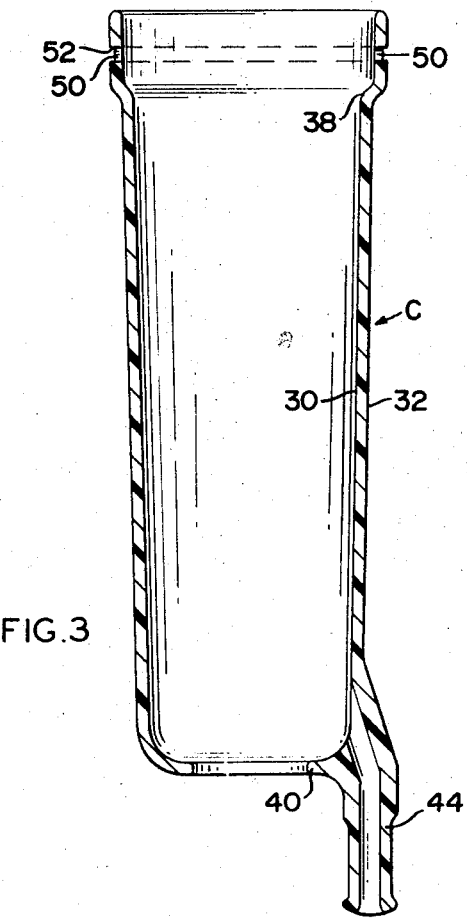
INVENTOR.
DONALD S. CLOSE
BY
Meyer, Tilberry & Body
ATTORNEYS.

MILKING INFLATION SHELL

This invention pertains to the milking machine art and more particularly to an improved milking inflation shell.

Commercially available milking machines work on the principle of pressure differentials. That is, the pressure at the end of the teat of the cow is reduced so that the higher milk pressure in the teat cistern overcomes the resistance of the sphincter and allows the milk to flow therethrough. In order to perform this operation a teat-cup assembly is secured to the teat of the cow. This assembly comprises an elongated, resilient milking inflation which is enveloped by a substantially rigid milking inflation shell. The upper and lower ends of the shell are secured to the milking inflation to form a hermetically sealed area between the shell and the inflation. Milking machines are equipped with a pulsating vacuum line and a vacuum milk line. The pulsating vacuum line is connected to a port on the shell and causes air to pass into and out of the sealed area between the shell and the inflation according to the phase of the pulsation. The vacuum milk line is connected to the lowermost end of the inflation and causes a vacuum to be continuously applied to the inside of the inflation and, thus, to the end of the teat.

In operation, the pulsating vacuum line allows air to enter the area between the inflation and the shell, the inflation collapses below the end of the teat and, for a brief period, seals the end of the teat from the vacuum which is being continuously applied through the vacuum milk line. This is called the "resting phase." During this phase blood is allowed to return to the upper portions of the teat after being drawn to the end of the teat by the vacuum applied through the vacuum milking line. When the pulsating vacuum line causes the air in the chamber between the shell and liner to be pumped out, thus, substantially equalizing the pressure on the inside and the outside of the inflation, the inflation opens and milking resumes. This is called the "milking phase."

During pulsation a force is developed between the inflation and the shell at the point where they are sealed together. This force is tensive in nature and has a tendency to destroy the hermetic seal which exists therebetween, by drawing the inflation into the upper end of the shell. When this happens the inflation will not collapse during the "resting phase," or does not collapse for a sufficient duration. As a result, congestion and damage will occur to the teat end because the milking line vacuum will then have been constantly applied to the teat and there is in effect, little or no "resting phase."

Commercially available teat-cup assemblies have employed various practices to overcome the aforementioned problem of defective sealing between the inflation and the shell. One such prior art device uses a clamp to secure the inflation on the shell. This method has not only proved unsuccessful, but has resulted in the creation of additional problems. Thus, for example, it has been found that when a clamp is used to retain the inflation on the shell there is a tendency for the clamp to cut into the inflation which is normally manufactured out of a soft elastomeric material such as rubber or vinyl plastic. Once the inflation is cut it is of no further use and must be replaced. Furthermore, the use of clamps adds to the overall weight of the teat-cup assembly. This is an undesirable feature since it places an additional strain on the teat, which in some instances may impair the cow's ability to discharge the milk. The use of a clamp also makes the assembly and cleaning of the teat-cup assembly more difficult; cleaning being an essential aspect of such a device in view of the sanitary conditions which must be maintained. Lastly, the use of a clamp increases the overall cost per unit, not to mention the additional cost which is generated by its use, namely the replacement of damaged inflations.

The present invention contemplates a new and improved milking inflation shell which overcomes all of the above-referred problems and others and provides a means for securing the inflation to the shell which is simple, economical and obviates the need for external locking devices, such as clamps.

In accordance with the present invention there is provided an inflation shell for use with a milking inflation of the type having a body portion, a teat-receiving collar and a folded-down cuff portion having an inner face adapted to contact a longitudinal segment of the shell, comprising: a substantially elongated, rigid, cylindrical member adapted to envelop a longitudinal section of the inflation body portion; the shell having an interior area and an outer surface; port means in the shell adapted to be connected to a source of pulsating vacuum for introducing a pulsating vacuum into said interior area; and at least one aperture means in the shell defining a passageway between the interior area and the outer surface of the shell; said aperture means being located in that longitudinal segment of said shell which is adapted to be contacted by the inner face of the folded-down cuff portion, whereby communication is established between the port means and the outer surface of the shell.

The principal object of the present invention is to provide an improved milking inflation shell which is capable of being in sealing engagement with a milking inflation without the use of external clamping devices.

Another object of the present invention is to provide an improved milking inflation shell which is adapted to be used in conjunction with commercially available milking inflations.

A further object of the present invention is to provide an improved milking inflation shell which may be rapidly removed from its sealed position around the milking inflation for purposes of cleaning and sterilization.

A still further object of the present invention is to provide an improved milking inflation shell of minimal weight.

Yet another object of the present invention is to provide an improved milking inflation shell which is simple and economical to manufacture.

These and other objects and advantages will become apparent from the following description used to illustrate the preferred embodiment of the present invention when read in conjunction with the accompanying drawings in which:

FIG. 1 is a cross-sectional view of a teat-cup assembly illustrating an improved milking inflation shell according to the preferred embodiment of the present invention;

FIG. 2 is a cross-sectional view of the upper portion of a modified form of teat-cup assembly having an improved milking inflation shell according to the present invention; and FIG. 3 is a cross-sectional view of the modified form of milking inflation shell of FIG. 2.

Referring now to the drawings wherein the showings are for the purpose of illustrating the preferred embodiment of the present invention only and not for the purpose of limiting same, FIG. 1 shows a teat-cup assembly, designated generally by the reference letter A, comprising a milking inflation B and a milking inflation shell C. Commercially available milking inflations B are generally made from a variety of natural and synthetic elastomers such as rubbers and vinyl plastics. The milking inflation shell C may be formed from a variety of materials such as metal or glass, but in the preferred embodiment illustrated it is formed of a synthetic plastic material such as acrylates, e.g. methyl methacrylate, polycarbonates, polyphenylene, methylpentene, polysulfones, rigid vinyls, etc., and is preferably transparent.

The milking inflation B comprises an elongated, resilient, tubular body portion 10 having upper and lower ends 12 and 14 respectively, and an internal bore 16 of constant taper virtually the entire length thereof; a generally cylindrical folded-down cuff portion 18 integral with the upper end 12 of the body portion 10 and having an inner face 20; and a teat-receiving collar 22 also integral with the upper end 12 of the body portion 10 and extending radially inward therefrom. The lower end 14 of the body portion 10 is adapted to be connected to a vacuum milk line, fragmentarily shown as 24, which provides a source of constant vacuum, as is well known in the art. In this manner milk flowing down the body portion 10 of the milking inflation B is suitably collected.

In accordance with the preferred embodiment of the present invention, there is provided a substantially rigid cylindrical milking inflation shell C having an inner surface 30 and an outer surface 32. The shell C envelopes a longitudinal section of the body portion 10 to define a generally hermetically sealed area 34 intermediate the body portion and the inner surface 30 of the shell. The cuff portion 18 is normally in a folded-down position to form a seal between the inflation B and the shell C at the upper end 12 of the inflation. In this position the inner face 20 of the folded-down cuff portion 18 is in contact with a longitudinal segment of the outer surface 32 of the shell C. With the cuff portion 18 in the folded-down position over the shell C, a circumferential ridge 36 on the cuff portion complements a necked segment 38 located at the upper end 12 of the shell C. In this manner the upper end of the shell C is in general sealing engagement with the body portion 10.

There is further provided means for sealing the lower end of the shell C to the body portion 10 which may take many forms; however, in the preferred embodiment of the present invention it takes the form of a lip 40, which is disposed on the lowermost end of the shell C, in sealing engagement with a pair of corrugations 42 that are integral with the body portion 10 and intermediate the ends 12, 14 thereof. The area 34 can only be maintained in a hermetically sealed state if the above described seal at the lower end 14 of the shell C and the aforementioned seal at the upper end 12 of the shell remain in tact. Failure of either of these seals will render the teat-cup assembly A partially inoperable.

Shell C is further provided with aperture means in the form of a tube 44 which extends outward from the shell and is adapted to be connected to a pulsating vacuum line (not illustrated), which forms no part of the present invention. With the pulsating vacuum line in place on the tube 44, air passes into and out of the sealed area 34 according to the phase of the pulsation. The in rush of air causes the body portion 10 to collapse below the end of the teat and, for the brief period defined by the pulsation seals the end of the teat from the vacuum which is being continuously applied through the vacuum milk line 24. When the air is removed from the seal area 34, thus substantially equalizing the pressure on the inside and the outside of the body portion 10, the body portion opens and a vacuum is once again applied to the end of the teat by the vacuum milk line 24.

In accordance with the present invention there is provided at least one aperture means in the shell C which may take many forms; however, in the preferred embodiment of the present invention it takes the form of a pair of annular openings 50 which provide a passageway between the sealed area 34 and the outer surface 32 of the shell. The annular openings 50 are located in that longitudinal segment of the shell C which is in contact with the inner face 20 of the folded-down cuff portion 18. As such, communication is established between the tube 44 and the inner face 20 of the folded-down portion 18. It is to be appreciated that while only two annular openings 50 have been illustrated, the aperture means may be comprised of any number of openings of various size and shape, subject only to space restriction. The removal of air from the sealed area 34 by the pulsating vacuum line (not illustrated) will cause a vacuum seal to be created between the inner face 20 of the folded-down cuff portion 18 and the outer surface 32 of the shell C which will hold the cuff portion tenaciously to the shell. The provision of the aforementioned vacuum seal thus obviates the need for the use of external clamping means, whereby the cost and weight of the teat-cup assembly A is reduced and the cleaning operation made easier.

Referring now to FIGS. 2 and 3, wherein there is shown a modified arrangement of the improved milking inflation shell C of the present invention. As best shown in FIG. 3, a circumferential groove 52 has been provided in the outer surface 32 of the shell C. THe circumferential groove 52 is located intermediate the necked segment 38 and the uppermost end of the shell C, and hence within that longitudinal segment of the shell which is in contact with the inner face 20 of the folded-down cuff portion 18. As shown in FIG. 2, a circumferential projection 54 has been provided on the inner face 20 of the folded-down cuff portion 18. The circumferential projection 54 is so located, that when the cuff portion 18 is in the normally folded-down position over a longitudinal segment of the shell C, the projection is in locking engagement with the groove 52. In this embodiment, it is suggested that the annular openings 50, which may vary in number, size, and shape, be disposed within the circumferential groove 52. When air is removed from the sealed area 34 by the pulsating vacuum line (not illustrated) atmospheric pressure surrounding the teat-cup assembly A exerts a force on the folded-down cuff portion 18 which causes the circumferential projection 54 to be pressed into the circumferential groove 52 forming a seal therebetween, whereby the folded-down cuff portion is tenaciously held to the shell C.

When it is desired to perform the milking operation the teat-cup assembly A is hung on the teat of a cow to form an airtight seal between the wall of the body portion 10 and the teat wall. The vacuum milk line 24 is connected to the lower end 14 of the body portion 10 and the pulsating vacuum line (not illustrated) is connected to the tube 44. Upon actuation of the milking machine the "milking phase" and the "resting phase" are alternated according to the rate of pulsation of the machine until the end point of milking, that is, until the udder and teats have been emptied of their milk.

During the "milking phase" vacuum is continuously applied to the internal bore 16 of the body portion 10 by the vacuum milk line 24. The wall of the body portion 10 forms a substantially airtight seal with the teat wall, whereby the vacuum is applied to the end of the teat. The pulsator of the milking machine applies vacuum in the sealed area 34 which substantially equalizes the negative pressures on the inside and outside of the body portion. Additionally, vacuum is applied to the inner face 20 of the folded-down cuff portion 18 by way of the annular openings 50. The atmospheric pressure surrounding the teat-cup assembly A is greater than the pressure in the annular openings 50, thus pressing the projection 54 into the circumferential groove 52 to retain and seal the cuff portion on the outer surface 32 of the shell C. Since the pressures have been equalized the internal bore 16 is open and the milk is allowed to flow therethrough to a collection receptacle.

During the "resting phase," vacuum is still continuously applied through the vacuum milk line 24. However, the pulsator allows air to enter the sealed area 34 which causes the wall of the body portion 10 to collapse below the end of the teat since the pressure on the outside of the body portion is greater than that within it. The end of the teat is now sealed from the vacuum being applied by the vacuum milking line 24.

When the milking operation is completed the teat-cup assembly A is removed from the teat and disassembled for cleaning purposes. The cleaning operation is facilitated by the improved shell C of the present invention since external clamps are not used, thereby reducing the time and labor required to disassemble the teat-cup assembly A.

In view of the foregoing, it can be readily seen that the present invention provides an improved milking inflation shell C which obviates the need for external locking devices to maintain a sealing engagement between the milking inflation and the milking inflation shell. By so doing, an inexpensive and easy to manufacture inflation shell is provided which forms the basis for a lightweight and readily cleanable teat-cup assembly.

I claim:

1. A teat-cup assembly for use with an automatic milking machine of the type having a vacuum milk line and a pulsating vacuum line, comprising: a milking inflation having an elongated, resilient, tubular body portion; said body portion having upper and lower ends; said lower end adapted to be connected to said vacuum milk line; a generally cylindrical folded-down cuff portion integral with the upper end of said body portion and having an inner face; a teat-receiving collar integral with the upper end of said body portion and extending radially inward therefrom; a substantially rigid cylindrical shell having inner and outer surfaces enveloping a longitudinal section of said body portion; one end of said shell being in sealing engagement with said folded-down cuff portion, the inner face of said folded-down cuff portion being in contact with a longitudinal segment of the outer surface of said shell; means for sealing the other end of said shell to said body portion; the envelopment of said body portion by said shell defining a generally hermetically sealed area; port means in said shell adapted to be connected to the pulsating vacuum line for introducing a pulsating vacuum into said sealed area; and at least one aperture means in said shell defining a passageway between said sealed area and the outer surface of said shell; said aperture means being located in that longitudinal segment of said shell which is in contact with the inner face of said folded-down cuff portion, whereby communication is established between said port means and the inner face of said folded-down cuff portion.

2. The teat-cup assembly as defined in claim 1, wherein the outer surface of said shell includes a circumferential groove, said groove being located in that segment of said shell which is in contact with the inner face of said folded-down cuff portion.

3. The teat-cup assembly as defined in claim 2, wherein said aperture means is disposed in said groove.

4. The teat-cup assembly as defined in claim 3, wherein the inner face of said folded-down cuff portion includes a circumferential projection, said projection being located for locking engagement in said groove, whereby the introduction of the pulsating vacuum into said sealed area causes said projection to be retained in said groove.

5. The teat-cup assembly as defined in claim 1, wherein said rigid shell is transparent.

6. The teat-cup assembly as defined in claim 1, wherein said aperture means comprises a plurality of spaced openings.

7. An inflation shell for use with a milking inflation of the type having a body portion, a teat-receiving collar and a folded-down cuff portion having an inner face adapted to contact a longitudinal segment of said shell, comprising: a substantially elongated, rigid, cylindrical member adapted to envelop a longitudinal section of the inflation body portion; said member having an interior area and an outer surface; port means in said member adapted to be connected to a source of pulsating vacuum for introducing a pulsating vacuum into said interior area; and at least one aperture means in said member defining a passageway between said interior area and the outer surface of said member; said aperture means being located in that longitudinal segment of said member which is adapted to be contacted by the inner face of the folded-down cuff portion, whereby communication is established between said port means and the outer surface of said member.

8. The inflation shell as defined in claim 7, wherein the outer surface of said member includes a circumferential groove, said groove being located in that segment of said member which is adapted to be contacted by the folded-down cuff portion.

9. The inflation shell as defined in claim 8, wherein said aperture means is disposed in said groove.

10. The inflation shell as defined in claim 9, wherein said aperture means comprises a plurality of spaced openings.

11. The inflation shell as defined in claim 7, wherein said aperture means comprises a pair of spaced annular openings.

12. The inflation shell as defined in claim 7, wherein said member is transparent.